US012350854B2

(12) United States Patent
Kammer et al.

(10) Patent No.: US 12,350,854 B2
(45) Date of Patent: Jul. 8, 2025

(54) SLICING MACHINE WITH CROSS TRANSFER DEVICE FOR LOADING OUTSIDE THE MACHINE AND LOADING METHOD FOR A SLICING MACHINE

(71) Applicant: TVI ENTWICKLUNG UND PRODUKTION GMBH, Bruckmuehl (DE)

(72) Inventors: Raimund Kammer, Kolbermoor (DE); Christian Mueller, Rosenheim (DE)

(73) Assignee: TVI Entwicklung und Produktion GmbH, Bruckmuehl (DE)

( * ) Notice: Subject to any disclaimer, the term of this patent is extended or adjusted under 35 U.S.C. 154(b) by 276 days.

(21) Appl. No.: 18/123,475

(22) Filed: Mar. 20, 2023

(65) Prior Publication Data

US 2023/0330884 A1 Oct. 19, 2023

(30) Foreign Application Priority Data

Apr. 14, 2022 (DE) ......................... 102022109293.3

(51) Int. Cl.
*B26D 7/06* (2006.01)

(52) U.S. Cl.
CPC ......... *B26D 7/0683* (2013.01); *B26D 7/0608* (2013.01); *B26D 2210/02* (2013.01)

(58) Field of Classification Search
CPC . B26D 2210/04; B26D 7/0608; B26D 7/0683
See application file for complete search history.

(56) References Cited

U.S. PATENT DOCUMENTS

| | | | | |
|---|---|---|---|---|
| 5,724,874 A * | 3/1998 | Lindee | B26D 7/22 | 83/403.1 |
| 5,974,925 A * | 11/1999 | Lindee | B26D 7/01 | 83/403.1 |
| 6,045,071 A * | 4/2000 | Emsens | B26D 7/0641 | 241/101.4 |
| 7,603,936 B2 * | 10/2009 | Pryor | B26D 7/0625 | 83/567 |

(Continued)

FOREIGN PATENT DOCUMENTS

| | | |
|---|---|---|
| DE | 102004041915 A1 | 3/2006 |
| DE | 102016107849 A1 | 11/2017 |

(Continued)

OTHER PUBLICATIONS

German Search Report (with English Machine Translation) dated Jan. 23, 2023, Application No. 10 2022 109 293.3, Applicant TVI Entwicklung und Produktion GmbH, 16 Pages.

*Primary Examiner* — Sean M Michalski
(74) *Attorney, Agent, or Firm* — Brooks Kushman P.C.

(57) ABSTRACT

In order to be able to load a forming tube channel, which stands very steeply and is open at a front and top on a longitudinal side, correctly by checking and, if necessary, changing position of a product piece in the forming tube channel, instead of sliding the new product piece from the outside on a support plate to the forming tube channel in the machine and dropping it into the forming tube channel, the entire forming tube channel is moved from a cutting position outward to a loading position, the product piece is inserted there and an entire transfer device in the form of one or more slides is moved back to the cutting position and locked there.

15 Claims, 10 Drawing Sheets

(56) References Cited

U.S. PATENT DOCUMENTS

| | | | | |
|---|---|---|---|---|
| 10,245,745 | B2 | 4/2019 | Voelkl | |
| 11,213,037 | B2 * | 1/2022 | Völkl | B26D 5/00 |
| 2006/0196328 | A1 * | 9/2006 | Pryor | B26D 7/01<br>83/403.1 |
| 2007/0214969 | A1 * | 9/2007 | Mueller | B26D 7/01<br>99/485 |
| 2009/0314147 | A1 * | 12/2009 | Catelli | B26D 7/02<br>83/788 |
| 2012/0042757 | A1 * | 2/2012 | Weber | B26D 7/325<br>83/78 |
| 2015/0224667 | A1 * | 8/2015 | Weber | B26D 7/0683<br>83/23 |
| 2016/0271822 | A1 * | 9/2016 | Burk | B26D 7/08 |
| 2017/0113368 | A1 * | 4/2017 | Schmeiser | B26D 7/0625 |
| 2017/0361484 | A1 * | 12/2017 | Pardini | B26D 3/16 |
| 2019/0232513 | A1 * | 8/2019 | Erné | B26D 7/32 |
| 2019/0281843 | A1 * | 9/2019 | Völkl | B26D 5/00 |
| 2021/0092967 | A1 | 4/2021 | Voelkl | |
| 2022/0032487 | A1 * | 2/2022 | Bauer | B26D 7/0625 |
| 2022/0304318 | A1 | 9/2022 | Voelkl | |

FOREIGN PATENT DOCUMENTS

| | | | |
|---|---|---|---|
| DE | 102018106299 | B3 | 6/2019 |
| DE | 102019110025 | A1 | 10/2020 |
| DE | 102019110026 | A1 | 10/2020 |

* cited by examiner

SLICING MACHINE WITH CROSS TRANSFER DEVICE FOR LOADING OUTSIDE THE MACHINE AND LOADING METHOD FOR A SLICING MACHINE

CROSS-REFERENCE TO RELATED APPLICATIONS

This application claims priority to German Patent Application No. DE 102022109293.3 filed on Apr. 14, 2022, the disclosure of which is incorporated in its entirety by reference herein.

TECHNICAL FIELD

Slicing machines for slicing product pieces of elastic material such as sausage or cheese are mainly used in the food industry.

BACKGROUND

The material to be sliced may be meat or fish or any other food product.

A distinction must be made between

- on the one hand, elongated pieces with a cross section that remains constant over the length, so-called calibers or strands, in which, for example, sausage or cheese is produced and

- on the other hand, elongated product pieces in which the cross section changes over their length, such as product pieces made from grown meat.

In order to produce slices of approximately the same volume and thus the same weight, a uniform caliber only has to be advanced by the same feed distance for the slicing of a slice of the same thickness, for which so-called slicers are known, which cuts the slices at a very high cycle frequency.

In the case of non-uniform product pieces, this is achieved in the prior art by first pressing the product piece in a forming tube with a constant internal cross section over its length so that it fills this forming tube cross section as completely as possible, so that the product piece in this pressed state has a cross section that is the same and known over its length, including in its end regions.

Then, by specifying the slice thickness and pushing it forward out of the forming tube and cutting off this protrusion by one such slice thickness in each case, approximately weight-accurate slices can be cut off.

The problem here is that although the product pieces may have similar dimensions within a batch, these dimensions can vary greatly from batch to batch. The dimensions can differ even more depending on the place of origin of the piece of meat on the animal or even the type of animal.

It is therefore known that the forming tube has a cross section that can be varied in at least one transverse direction in order to be able to insert and press product pieces with different cross sections.

In addition to the longitudinal press stamp that can be moved into the circumferentially closed forming tube in the longitudinal direction, the width of the forming tube channel can be changed and/or a cross press stamp that can be moved into the forming tube channel from its open longitudinal side can be used for cross pressing, which of course then requires longitudinal press stamps and/or cross press stamps of different or variable sizes that are kept in the machine, for example in the form of corresponding stamp turrets.

It is also known to provide a forming tube turret with several forming tubes of different sizes and/or shapes in terms of their cross section, which can be used as required, and which, in the case of two identical forming tubes, also allows loading of one of the two identical forming tubes while slices are currently being cut at the other forming tube.

However, pressing not only in the longitudinal direction but also in the transverse direction of the product piece on a forming tube turret with several forming tubes is difficult to realize.

Irrespective of the various embodiments described above, the cutting unit of such slicing machines is often located at working height, and the forming tube extends from there tilted backwards to the top, sometimes even above head height. This makes manual loading of the open forming tube, i.e., the forming tube channel, very difficult.

Adjusting the loaded forming tube on the one hand to the position of the longitudinal press stamp and, if necessary, the cross press stamp, but also relative to the cutting plane in which the blade moves, can then also cause difficulties.

SUMMARY

It is therefore the object of the invention to provide a loading device for a generic slicing machine which minimizes the above-mentioned problems despite a simple and inexpensive construction of the loading device, as well as a method for operating such a slicing machine.

A generic slicing machine comprises a base frame as well as a forming tube channel extending in longitudinal direction fixed to the base frame and having an open longitudinal side and a channel cavity open at both ends for receiving a product piece.

The open longitudinal side can be closed by a cross press stamp which can be displaced tightly into the open longitudinal side in a 1st transverse direction, the transverse press direction, to form a circumferentially closed forming tube open at the end face, a longitudinal press stamp being present which can be moved tightly into the rear end of the forming tube cavity in the longitudinal direction for pushing forward and longitudinally pressing the elastic product piece located therein—which consists of a foodstuff—in the feed direction towards the cutting end of the forming tube.

During cross pressing and slicing, the upright longitudinal center plane of the cross press stamp in use must also be centered between the two inner surfaces of the side walls of the forming tube channel so that the cross press stamp is centered and, in particular, tightly seated in the forming tube channel.

The slicing machine further comprises a loading device for loading the forming tube channel through the open longitudinal side, and of course a cutting device with a blade which moves in a transverse direction in a blade plane lying perpendicular to the feeding direction and cuts off the protrusion of the product piece pressed to a uniform caliber protruding from the front end, the cutting end, of the forming tube.

According to the invention, the loading device comprises a transfer device which supports the forming tube channel (1U) and is embodied in such a way that it is able to transfer the forming tube channel (1U) from a loading position further away from the upright longitudinal center plane (10") of the cross press stamp (5.1-5.6), in particular outside the base frame (12) of the machine, in transverse direction to the feed direction (10) to a slicing position in which the longitudinal center plane (10") runs between side walls (1U1, 1U2) of the forming tube channel (1U), in particular centrally between their inner surfaces.

Since transferring can be done in particular in a horizontal transverse direction, loading of the forming tube channel is facilitated by the fact that no loading is necessary through the rear end face of the forming tube or forming tube channel, which is very high because of the upright position.

Preferably, the transfer device comprises a base slide which is displaceable in the transfer direction, preferably the second transverse direction—which is perpendicular to the first transverse direction, the transverse pressing direction on the one hand and the longitudinal direction on the other hand—and which also carries the forming tube channel, which is part of the transfer device, in particular the base slide, and can accordingly be transferred from the loading position to the cutting position.

This allows the operator to insert the product piece into the forming tube channel in the easily accessible loading position, and at the same time to check and, if necessary, correct the position of the product piece in the channel, which is not possible if the product piece falls into the open longitudinal side or also an open end side of the forming tube channel only in its cutting position within the machine.

In order to be able to adjust the width of the forming tube channel, the distance between the side walls in the 2nd transverse direction is adjustable, preferably in steps.

This can be achieved either by an additional slide, which carries a first side wall, being arranged on the base slide so as to be movable in the transfer direction, and the other, second side wall being adjustable relative to it, i.e., relative to the additional slide and thus also to the first side wall, in the transfer direction.

Since the adjustment can be made by a simple method and the fixing in a certain transverse position can be done positively by inserting a locking bolt into a locking opening, this results in a very simple construction.

However, during transverse pressing and slicing, i.e., when the cross press stamp is immersed, the two side walls must be symmetrical to the upright longitudinal center plane of the cross press stamp, which is therefore exactly midway between its two longitudinal edges running in the feeding direction. Therefore, for each of the possible predetermined widths of the forming tube channel—for which there is also a transverse press die with this width in each case—on the one hand the additional slide is positioned in relation to the basic slide in the transverse direction, in particular the transfer direction, and fixed by means of a first locking device, and on the other hand likewise the second side wall to the additional slide by means of a second locking device.

Alternatively, a first side wall can be fixed directly to the base slide in the transverse direction and the second side wall can be moved and fixed relative to it in this transverse direction relative to the first side wall, in particular by means of a first locking device. Then, however, there are different cutting positions for the base frame slide in the transverse direction, for example realized by a transverse stop for the base frame slide which is adjustable, preferably in steps, in particular by means of a second latching device, in order to ensure that the longitudinal center plane of the cross press stamp always runs in the center between the inner surfaces of the side walls when the forming tube channel is in the cutting position.

None of this is necessary if the forming tube channel is constructed in such a way that the two side walls can always only be adjusted in counter-synchronism towards or away from this longitudinal plane, which is located in the center between the side walls, regardless of whether this is done continuously or in steps and with fixing in the respective step, in particular positive fixing.

This can be done by means of separate drives, such as synchronized electric motors, or by means of only one drive and a corresponding counter-synchronous mechanism, such as a threaded spindle with two sections with circumferential threads thereon in two sections, one of which is a left-hand thread and the other a right-hand thread, matching corresponding internal circumferential threads in a spindle nut arranged in each of the side walls.

It is also important that when the forming tube channel reaches the cutting position, it is also positioned axially, i.e., relative to the blade plane in which the cutting edge of the blade rotates.

This can be achieved with a guide shoe which, in the transfer direction, runs with very little distance in a corresponding guide rail resting on both sides of the guide shoe, one of these two parts being attached to the base slide or additional slide and the other fixed to the base frame.

In the transfer direction, these two parts are arranged in such a way that they do not come into engagement with one another until towards the end of the movement path in the direction of the cutting position, an insertion slope being present on one of the two parts for easier insertion into one another.

The transfer path up to and also beyond this point can be covered by rollers rolling on rails running in the transfer direction, the rollers preferably being arranged on the base slide and the rails being fixedly fastened to the base frame for this purpose.

In particular, the guides, especially the base guides on which the base slide runs by means of rollers, are dimensioned in such a way that they are quite capable of deflecting when the forming tube channel is loaded in the first transverse direction, in particular by the transverse compression of a product piece located therein.

However, in the unloaded state of the forming tube channel, i.e., when no transverse compression is taking place, there is a support body located on the base frame at a very short distance below the base slide, so that when the forming tube channel is loaded and the base guides bend, the base slide moves in the direction of the support body and rests on it and is supported by it.

This allows the base guides and their attachment to the base frame to be relatively light, reducing the weight of the machine.

If, when the guide rail and the guide shoe run onto each other, there is an offset of the respective slide in the longitudinal direction, then either the roller must be slightly displaceable in this direction relative to the rail on which it runs or ran previously, or the additional slide must be displaceable relative to the base slide or the base slide relative to the rollers with which it runs on the rails, in particular by means of floating positioning.

In this way, the forming tube channel is again positioned axially exactly to the blade plane or cutting plane after each new loading.

For exact positioning in the cutting position in the transfer direction, preferably the 2nd transverse direction, a 3rd locking device is provided to prevent the basic slide from moving out of its cutting position during cutting operation.

This 3rd locking device can be deactivated by the operator and the operator side, in particular by pulling a release rod which releases this locking, whereupon the base slide only moves from the cutting position to the loading position.

In particular, an end position sensor is provided which detects whether the transfer device, in particular the base slide, in particular the forming tube channel, is in the cutting position, because cutting operation must not be started before then.

When the transfer device, in particular the base slide, in particular the forming tube channel is pulled out in the transfer direction from the slitting position to the loading position, the cross punch must no longer be inside the forming tube channel.

Therefore, a cross-stamp sensor is provided which detects whether the cross-stamp is inside or completely outside the forming tube channel and indicates and/or reports this to the control.

In a preferred embodiment, controlled drives are provided for adjusting and in particular positively fixing, in particular latching, the transfer device and/or the base slide in the cutting position and/or the additional slide, in particular the second side wall opposite the base slide and/or the second side wall in transverse direction to the additional slide.

In this way, supplemented by appropriate sensors, the entire loading device can be largely automated.

With regard to the method for slicing a product piece with a slicing machine comprising a forming tube channel for receiving the product piece and feeding it in a feeding direction to the slicing unit, in particular the blade, of the machine, as well as a loading device for the forming tube channel—wherein it can in particular be a slicing machine as described above—the existing object is solved in that that the product piece is transferred from a loading position to a cutting position, the cutting position being closer to or in particular on the longitudinal center plane of the cross press stamp than the loading position.

In this way, it is possible to provide the loading position at a location that is easily accessible to the operator and easily visible into the forming tube channel, which makes it much easier to deposit a product piece in the correct position in the forming tube channel.

Located on the longitudinal center plane is intended to mean that the longitudinal center plane runs between the two side walls of the U-shape located in the cutting position, in particular exactly midway between the two inner surfaces of the two side walls.

Preferably, the product piece is transferred by allowing the forming tube channel itself to be transferable between a loading position or a slitting position and thus allowing the product piece to be inserted into the forming tube channel at the easily visible loading position.

Before the slicing operation begins, the forming tube channel loaded with a new product piece is not only transferred, in particular displaced, to the slicing position, but also locked there, in particular positively locked, since damage to the machine could occur if the forming tube channel were to move away from its slicing position during the slicing operation.

In the longitudinal direction of the forming tube channel, it is finely adjusted relative to the blade plane during transfer to the slitting position or shortly thereafter.

The side walls of the forming tube channel can be fixed in their distance to each other and/or to the longitudinal center plane, in particular positively fixed, in order to correctly maintain the transverse compression.

If the loaded forming tube channel shifts in its position in this first transverse direction when loaded in the transverse pressing direction due to the material elasticity of the machine, it is supported after a short distance by a supporting body of the base frame arranged there.

BRIEF DESCRIPTION OF THE DRAWINGS

Exemplary embodiments according to the invention are described in more detail below. The figures show.

DETAILED DESCRIPTION

Figure 1A:
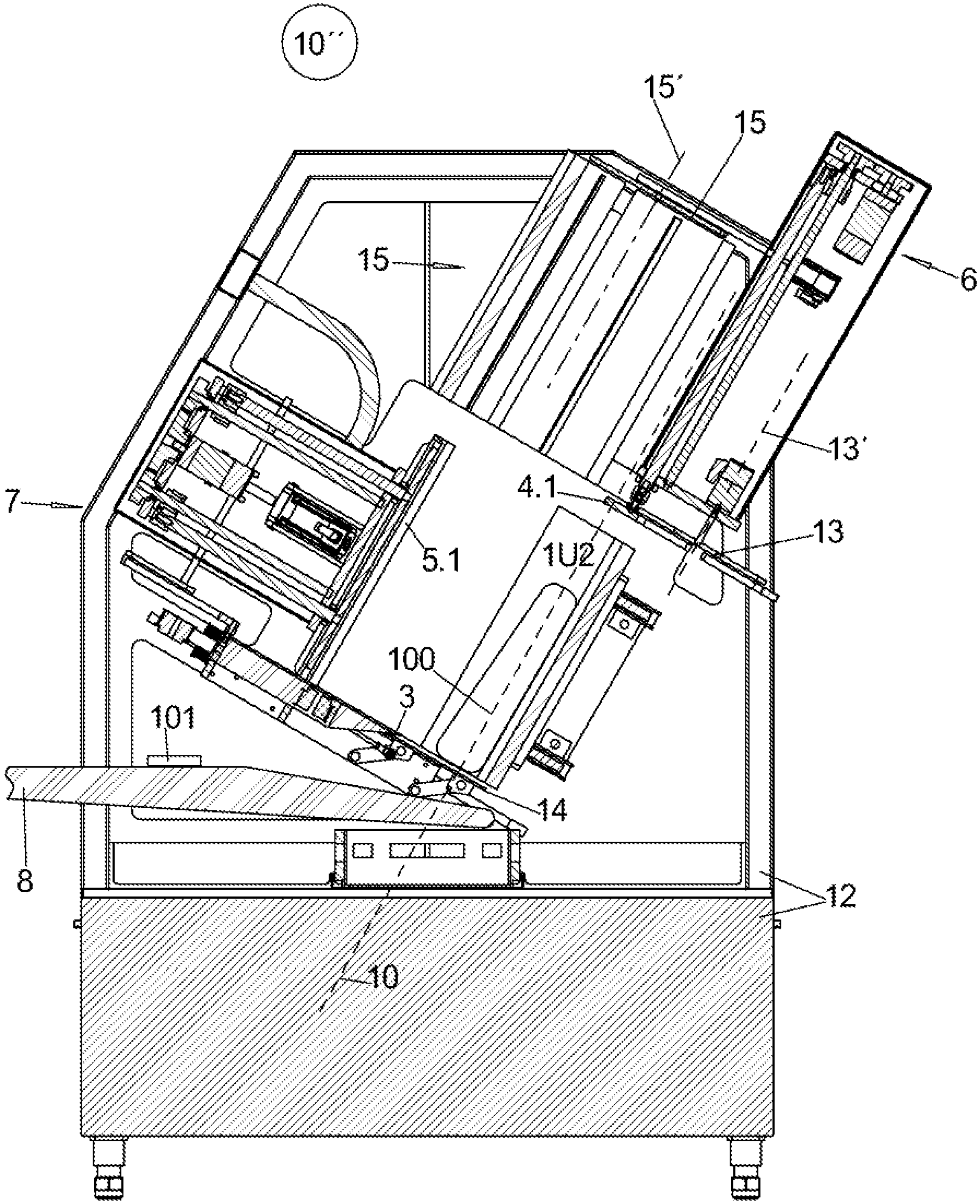
FIG. 1*a*: a known slicing machine in a sectional view along the longitudinal center plane with pressing stamps attached to the press drives for longitudinal pressing and transverse pressing.

FIGS. 1*a, b* show a slicing machine with a base frame 12—but without an operating unit—according to the state of the art in side view, cut open along its longitudinal center plane 10" and reveal its basic principle:

A product piece 100 with a cross section that is still irregular along its length is first inserted into a very steep forming tube channel 1U running in longitudinal direction 10, of which primarily the side wall 1U2 is visible in FIG. 1*a* and which has an open longitudinal side facing upwards and forwards, as shown in FIG. 1*a*.

Figure 1B:
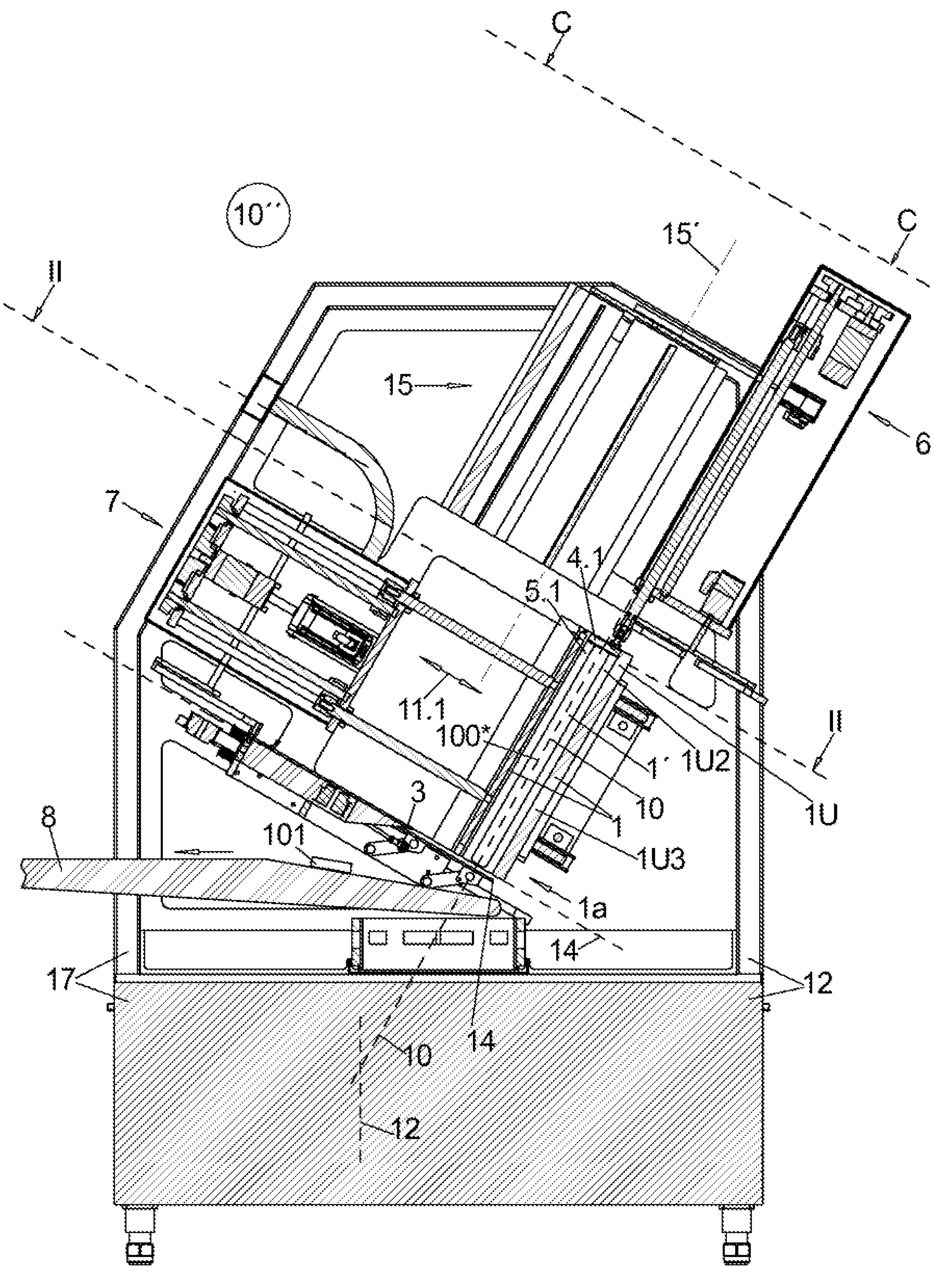
FIG. 1*b*: a view similar to FIG. 1*a*, but with both stamps already in the forming tube channel.
Figure 1C:
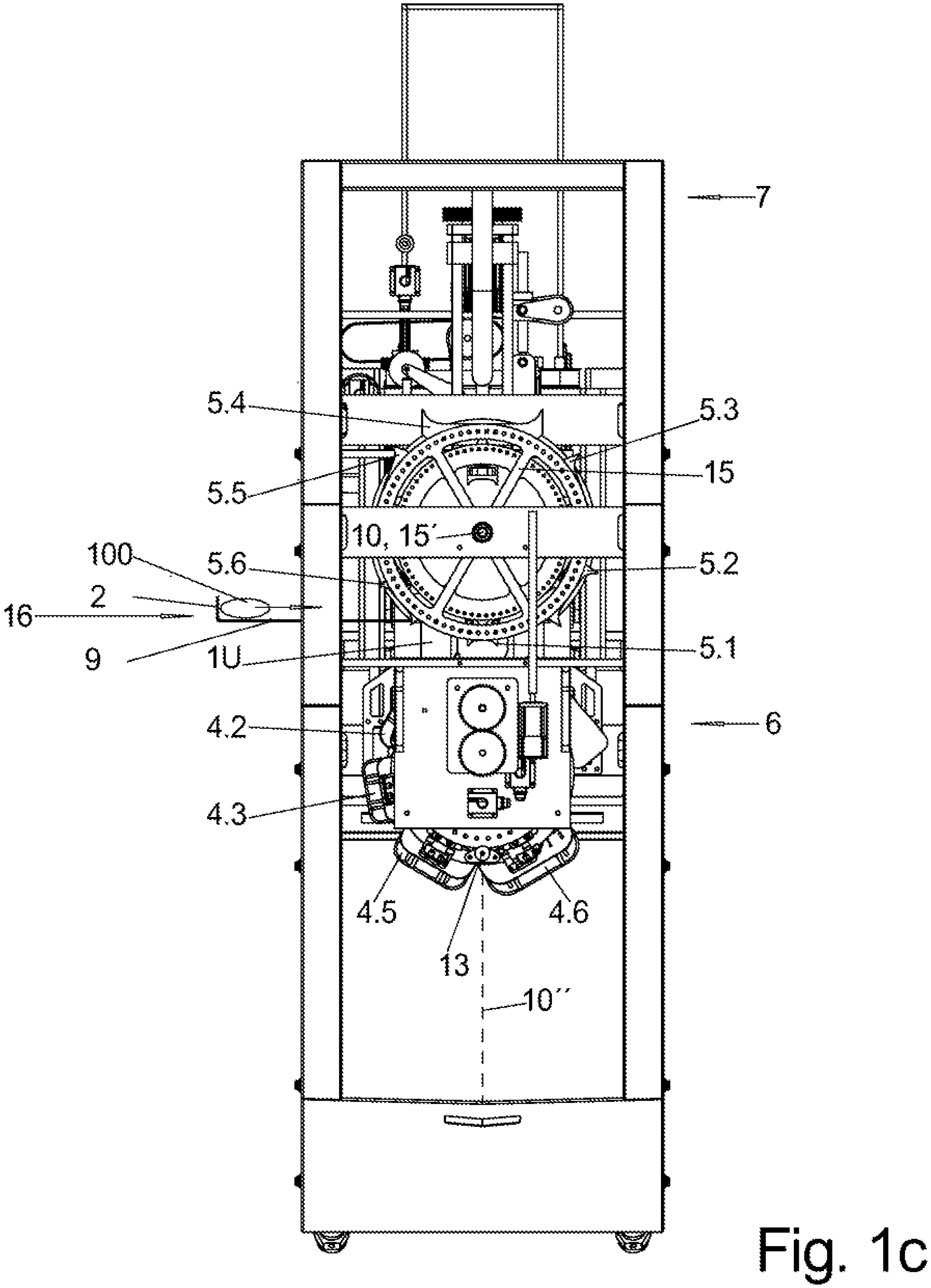
FIG. 1*c*: a top view of the slicing machine of FIG. 1*a, b* in the direction of longitudinal pressing, i.e., at the level of the cutting plane C-C in FIG. 1*b,*
Figure 2:
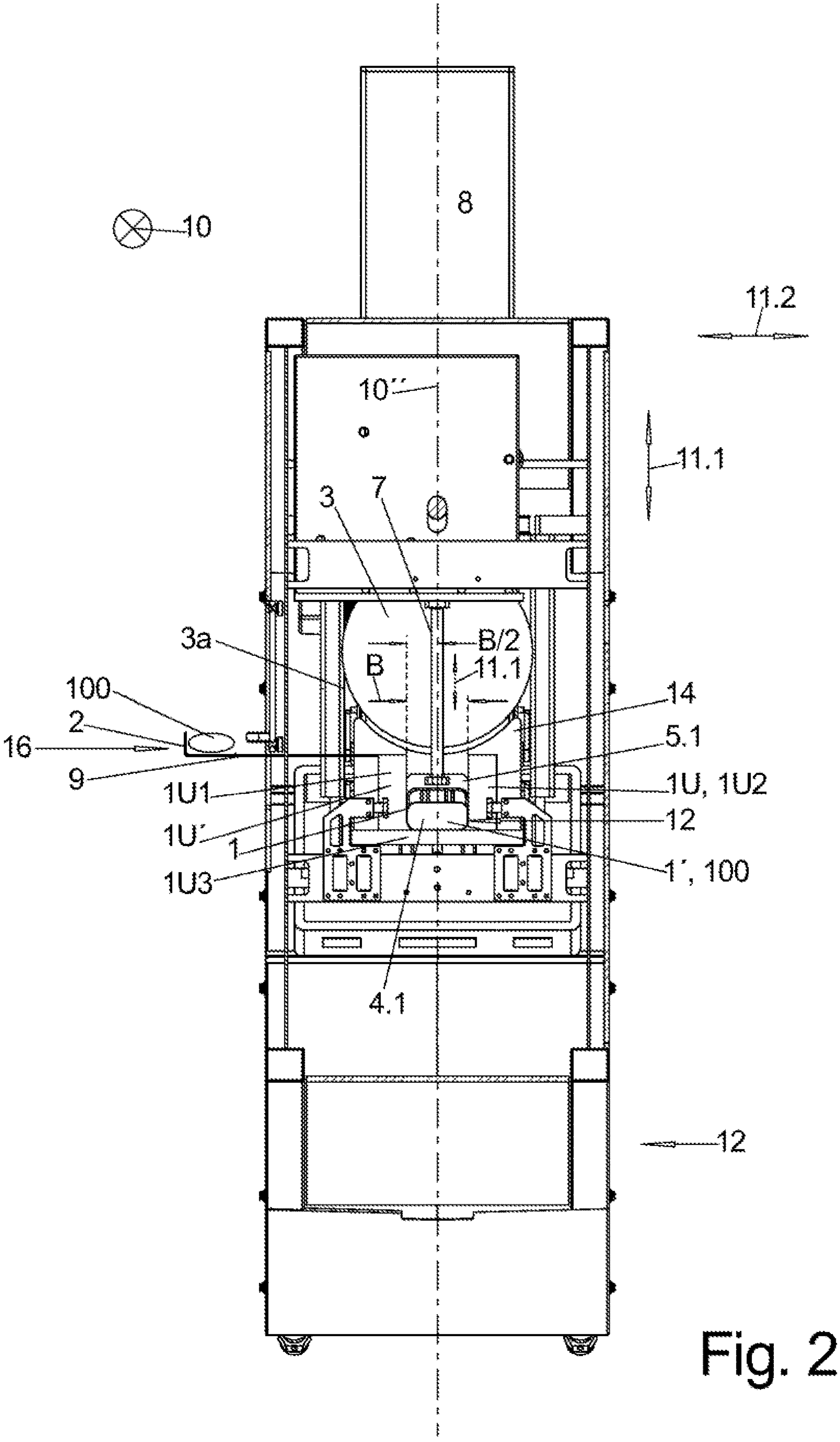
FIG. 2: the slicing machine of FIGS. 1*a-c* cut along the cutting plane II-II, FIGS. 3*a, b*: a first embodiment of a loading device according to the invention, viewed in the longitudinal pressing direction, as a sectional enlargement of the area marked in FIG. 2 in the known machine, in various functional positions.

FIG. 1*c* and FIG. 2 show as a loading device 16 a support plate 9 extending laterally to the outside of the base frame 17 of the machine and also inclined steeply in longitudinal direction 10, which projects laterally to the operator side from the base frame 12 of the machine, on which a product piece 100 can be placed outside the machine and by means of a pusher 2 in the second transverse direction 11.2 into the machine over the upper end of one side wall 1U1 of the forming tube channel 1U, so that the product piece 100 falls into the forming tube channel 1, but in an uncontrolled manner.

Subsequently, the open longitudinal side of the forming tube channel 1U is circumferentially closed to form a forming tube 1, e.g., by driving in a cross press stamp 5.1 fitting exactly into it in transverse direction 11.1 to the longitudinal direction 10, the transverse press direction 11.1, by means of a transverse press drive 7 according to FIG. 1*b*.

At the same time or subsequently, as shown in FIG. 1*b*, a longitudinal press stamp 4.1 is moved into the forming tube 1 from the rear, upper end by means of a longitudinal press drive 6 and presses the product piece 100 as it continues to move forward in the longitudinal direction 10.

Longitudinal pressing and transverse pressing together cause the irregularly shaped product piece 100 in the forming tube 1 to be deformed into a caliber 100* with a uniform cross section in longitudinal direction 10.

For cutting, this caliber 100* is pushed forward in a controlled manner by the longitudinal press stamp 4.1 beyond the front, lower open end, the cutting end 1*a*, of the forming tube 1 to a stop plate 14 arranged at a distance in front of it, the stop surface of which defines the stop plane 14'.

By moving the cutting edge 3*a* of a blade 3 rotating about a blade axis 3', which runs parallel to the longitudinal direction 10, in a transverse direction to the longitudinal direction 10, here also the transverse pressing direction 11.1, this protrusion of the caliber 100* is cut off as a slice 101, falls onto a discharge conveyor 8 and is conveyed by the latter out of the base frame 12 of the machine.

As best shown in FIGS. 1*a, b* and 2, the forming tube channel 1U consists of two side walls 1U1, 1U2, as well as a bottom 1U3, wherein the side walls 1U1, 1U2 are adjustable in their clear transverse distance, the width B, from one another by moving, in particular along the bottom 1U3, in the 2. transverse direction 11.2, which runs transversely, in particular in each case at a 90° angle, to both the axial direction 10 and the 1. transverse direction 11.1.

In this embodiment, the side walls 1U1, 1U2 are always symmetrical to the longitudinal center plane 10", which is defined by the first transverse direction 11.1 and the longitudinal direction 10 and which runs stationary parallel to the inner surfaces of the side walls 1U1, 1U2 and/or perpendicular to the surface of the bottom 1U3, and to the inner surfaces of the two side walls 1U1, 1U2 of the forming tube channel 1U, which is in the cutting position, at the same distance B/2 on both sides, and/or in particular at the same distance B/2 on both sides to the two lateral longitudinal edges of the cross press stamp 5.1.

The side walls 1U1, 1U2, or more precisely the inner surfaces of the side walls, preferably run parallel to one another so that a cross press stamp 5.1 with a fixed width can be inserted between them with an exact fit.

For this purpose, the side walls 1U1, 1U2 can be moved to certain, fixed cross distances, to each other and thus to the longitudinal center plane 10", and for each of these defined widths B, i.e., inner free widths, of the molded tube channel 1U, a cross press stamp 5.1 to 5.6 with an analogous width is provided, since the cross press stamps are not variable in width.

For this purpose, the cross press stamps 5.1 to 5.6 are held in a cross press stamp turret 15—as best shown in FIGS. 1*a-c*—whose rotary axis or shift axle 15' runs parallel to the longitudinal direction 10 but is offset relative to the forming tube channel 1U in such a way that the closest cross press stamp 5.1 facing the forming tube channel 1U is still radially and axially outside the extent of the forming tube channel 1U, and from there the matching cross stamp can be pulled out downwardly from the cross stamp turret 5. and pulled onto the cross press drive 7 and locked there.

Different longitudinal press stamps 4.1 are used in each case for the free inner width of the forming tube 1, which thus changes in steps, and these are held in a longitudinal stamp turret 13, the shift axle 13' of which runs parallel but offset to the shift axle 15' of the cross stamp turret 15.

From there, too, the appropriate longitudinal press stamp 4.1 can be automatically selected and attached to the longitudinal press drive 6.

FIG. 2 shows only the longitudinal press stamp 4.1 in use, since this section lies above this longitudinal press stamp 4.1, which has already been inserted into the forming tube 1, but already below the longitudinal stamp turret 13, on which the other longitudinal press stamps 4.1-4.6 are located.

Therefore, in addition to the forming tube 1, the circular disk-shaped blade 3 can already be seen as well as the stop plate 14 arranged next to it, the functional edge of which is convexly curved and runs parallel to the outer circumference of the circumferential edge, the cutting edge 3*a* of the blade 3, usually at a small radial and usually also axial distance from it.

FIG. 2 further shows the actuating devices for the two side walls 1U1 and 1U2 in order to displace them along the bottom 1U3 and thus to adjust the width B of the forming tube channel 1U to a predetermined value corresponding to the width of one of the cross press stamps 5.1-5.6.

The selection of the punches to be used for pressing and slitting can be partially or completely automated in that the machine itself analyzes, in particular measures, the still irregular, unpressed product piece 100 to such an extent that the control of the machine can automatically select the correct cross press stamp and longitudinal press stamp, for which the product piece 100 usually first has to be in the machine in order to be analyzed by corresponding sensors.

Figure 3A:
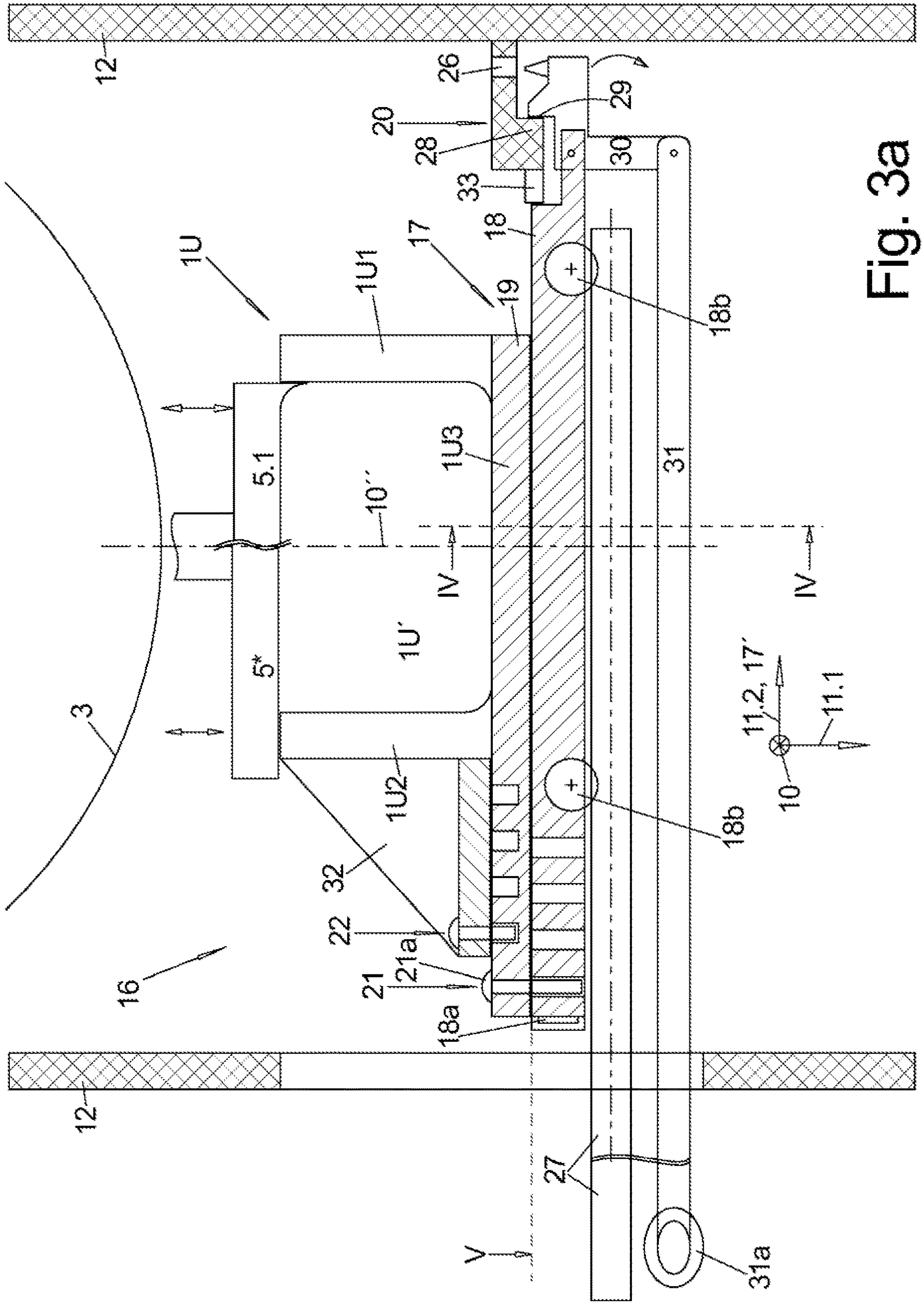
Figure 3B:
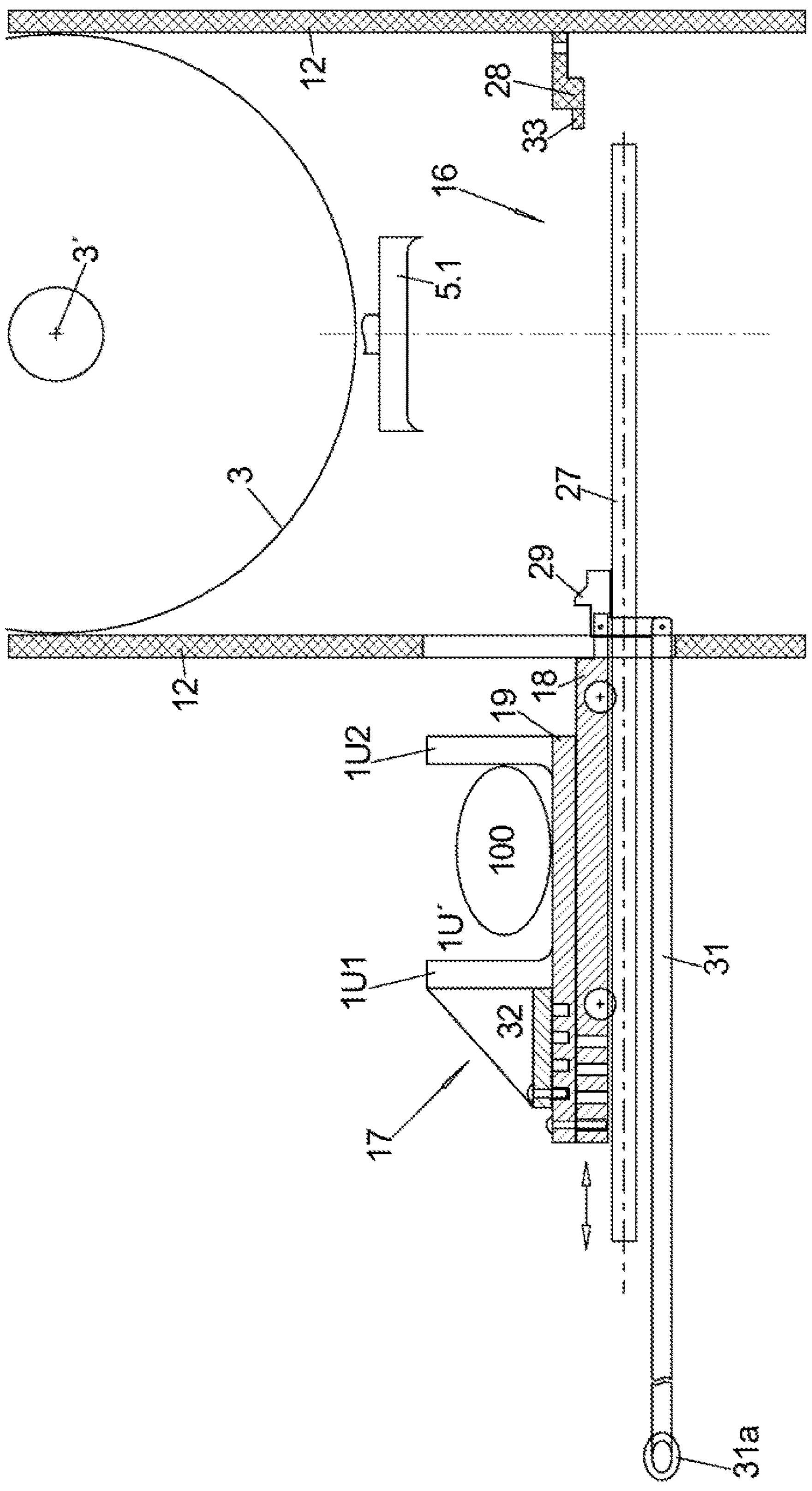

FIG. 3*a* shows in the cutting position and FIG. 3*b* in the loading position the transfer device 17 which carries the forming tube channel 1U and which is part of the loading device 16.

With this transfer device 17, the U-shape 1U can be moved laterally outside the base frame 12 of the machine, as can be seen in FIG. 3*b*, and in this loading position, an operator can insert a piece of product 100 into the forming tube channel 1U, which is steep but open at the top towards the front, in such a way that its position can be easily seen and corrected.

As can best be seen in FIG. 3*a*, the transfer device 17 consists at least of a base slide 18 which can be moved in the 2. transverse direction 11.2, the transfer direction 17', along slide rails 27, of which there are two spaced apart one behind the other in the viewing direction of FIGS. 3*a, b* and on which the base slide 18 can be moved with rollers 18*b*.

Since the slide rails 27 lie approximately horizontally, the operator can grasp the steeply standing base slide 18 by a handle 18*a* arranged on its operator side B and pull it out until the forming tube channel 1U is located outside the base frame 12, of which the two side frames or side plates are shown here, as shown in FIG. 3*b*, for which purpose there must of course be a sufficiently large passage in one wall of the base frame 12. On the inside or outside of this passage, there may be a safety door which triggers a stop of the slicing machine as soon as it is opened during slicing operation.

The forming trough 1U must be in a defined cutting position according to FIG. 3*a* at least in transverse direction, in particular in such a way that the longitudinal center plane 10" of the cross press stamp 5.1 is at the same time the longitudinal center plane 10" between the inner surfaces of the side walls 1U1 and 1U2.

Since the width of the forming tube channel 1U, i.e., the mutual spacing of the inner surfaces of the two side walls 1U2 and 1U1, is also to be variable in steps, an additional slide 19, which carries one side wall 1U1, is displaceable in the transfer direction 17' on the base slide 18 and can be positively locked in certain transverse positions relative to the base slide 18 by means of a locking device 21.

Since, depending on the setting, the side wall 1U is at a certain distance from the longitudinal center plane 10", the other side wall 1U2 must also be set to this new distance on the other side of the longitudinal center plane 10", which is why this other side wall 1U2 in turn rests on the top of the additional slide 19 and can be latched relative to it in the transfer direction 17' in various transverse positions, in particular with a second latching device 22.

The latching device 21 consists of a through-hole in the plate-shaped additional slide 19, which is preferably at the same time the bottom 1U3 of the forming tube channel 1U or includes this bottom, but the through-hole is away from the forming tube channel 1U on the operator side in transfer direction 17'.

In the base slide 18, there are recesses, in this case through holes, at predetermined distances from each other, and the through hole in the auxiliary slide 19 can be brought into alignment with each of these recesses in the base slide 18 in the transfer direction 17', and a detent bolt 21*a* can be inserted into the base slide 18 through the additional slide 19 with a small radial clearance with respect to the diameters of the holes and recesses.

Similarly, the detent device 21 comprises a through-hole in the plate-shaped extension extending from the lower end of the side wall 1U2 away from the forming tube channel 1U and braced with respect to this side wall to form a supplementary slide 32, but the through-hole is located away from the forming tube channel 1U in the transfer direction 17'.

In the supplementary slide 19 there are recesses, in this case blind holes, at predetermined distances from one another, whereby the through hole in the plate-shaped extension of the supplementary slide 32 can be brought into alignment with each of these recesses in the supplementary slide 19 in the transfer direction 17' and a locking bolt 22*a* can be inserted through the plate-shaped extension into the supplementary slide 19, which has a small radial clearance with respect to the diameters of the holes and recesses.

In FIG. 3*a*, only for reasons of overview, no piece of product is shown in the shaped-pipe channel 1U, which, however, in this case is already closed on the open longitudinal side, which according to the right half of the illustration can be done by a suitable cross press stamp e.g., 5.1, which has the same width as the inner free width currently set free width of the forming tube channel 1U and can be moved tightly into this in the first transverse direction, the transverse pressing direction 11.1, in order to press the product piece located therein also in the transverse direction 11.1.

If this is not desired, a cover 5* that can be placed over the upper ends of the two side walls 1U1, 1U2 along the open longitudinal side is also sufficient.

The setting and adjustment of the transverse position of the supplementary slide 19 relative to the base frame 18 and also of the supplementary slide 32 is carried out before loading and preferably outside the base frame 12 of the machine in the loading position as shown in FIG. 3*b*.

In the cutting position of FIG. 3*a*, it is essential that the base slide 18 is and remains exactly in the cutting position in the transverse direction 11.2, this being ensured by a transverse stop 33 on the base frame 12, against which the base slide 18 can be moved, on the one hand, and a latching device 20, on the other hand, which prevents withdrawal from this stop 33 and thus from the cutting position in the latched state.

For this purpose, a latching projection 28, which in this case projects downwards, is formed on the base frame 12, behind which a latching nose 29, which comes from below and projects upwards, can engage, which latching nose 29 is pivotably fastened to the base slide 18 between a latched and unlatched position. The tilted latching nose 29 can be unlocked by means of a drawbar 31, which extends from the latching device 20 arranged on the anti-operator side under the base slide 18 to the operator side and can be gripped there, in particular outside the base frame 12, by an operator in order to be able to pull the base slide 18 out into the loading position for new loading of the forming tube channel 1U.

For this purpose, of course, no cross press stamp 5.1 may be located inside the forming tube channel 1U, but must have moved out of it against the cross press direction 11.1, which can be checked by means of a sensor or also by means of a latching device not shown.

An end position sensor 26 is provided on the latching device 20, which detects the latched state of the latching nose 29 behind the latching projection 28, preferably without contact, and is connected in terms of signals to the control of the machine, so that no start of the slicing operation is possible without a basic slide 18 in the slicing position.

Not shown is a stop at the lower open end of the forming tube channel 1U, which is very steep, for the inserted product piece 100, which would otherwise slip out of the lower open end of the forming tube channel 1U.

This stop can be mounted stationary on the base frame 12 and extend close to the stop plate 14 in the transverse direction 11.2 shown in FIG. 1*a* to FIG. 2, which is connected to the blade 3.

Figure 4:
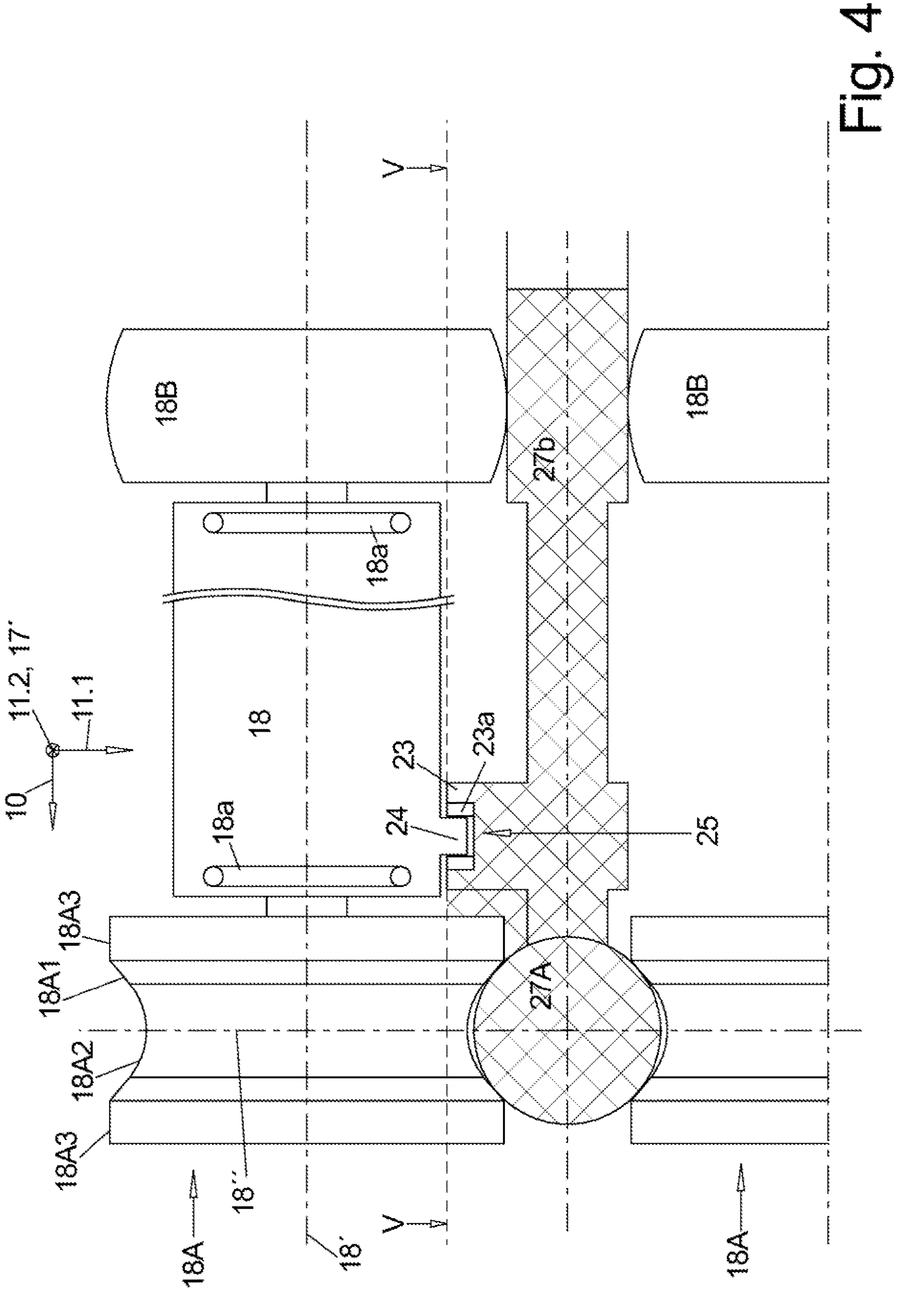
FIG. 4: a sectional view cut along the line IV-IV in FIG. 3*a,*
Figure 5A:
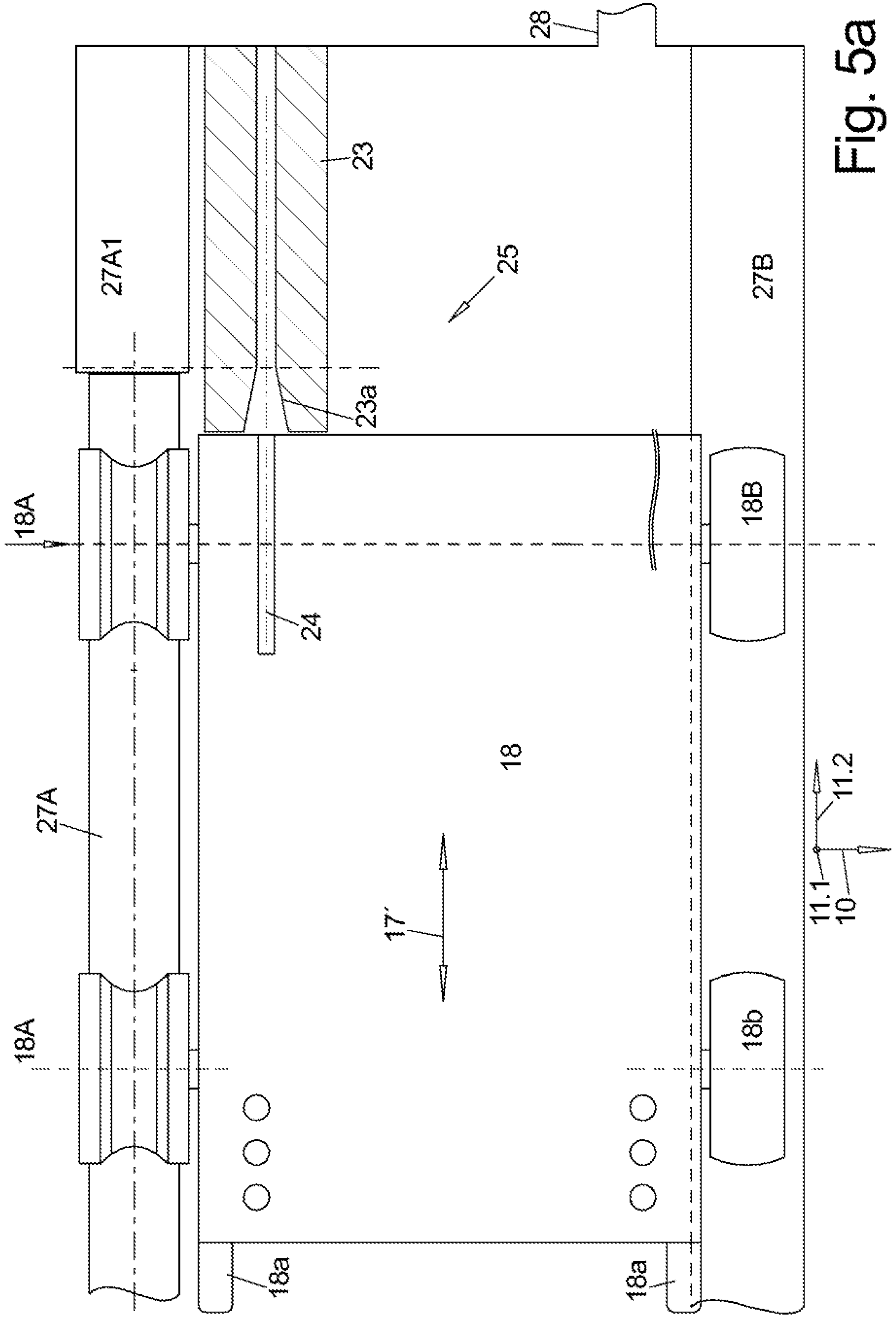
FIGS. 5*a, b*: a sectional view cut along the line V-V in FIG. 4, in different functional positions.

FIGS. 4 and 5*a, b* show how the base slide 18 can be adjusted very precisely to the blade plane 3" in the longitudinal direction 10 in the cutting position:

FIG. 4 shows, viewed in the transfer direction 17', the transverse direction 11.2, the base slide 18 rolling on a left-hand slide rail 27A with left-hand rollers 18A in this viewing direction and on a right-hand slide rail 27B with right-hand rollers 18B.

Whereas the right-hand rollers have a slightly crowned peripheral surface in cross section and roll on a flat support surface of the slide rail 27B, the left-hand rollers 18A have a peripheral groove into which the left-hand slide rail 27A partially dips, the roller 18A bearing against the periphery of the slide rail 27A with both flanks of its groove, i.e., on both sides of the longitudinal center plane 18A" of this roller 18A, which is transverse to its rotation axis 18'.

As a result, the roller 18A is held positively on the plunging slide rail 27A in the longitudinal direction, the longitudinal pressing direction 10, especially since the base slide 18 has, in addition to each roller resting on the upper side of the respective slide rail 27A, 27B, a respective counter-roller 18A* or 18B* on the opposite side of the respective slide rail 27A, 27B, which is necessary because of the rotational axis 18' of the rollers 18A, B, which in reality is very steep.

In order to permit temperature expansions of the base slide 18 in the longitudinal press direction 10, only the rollers 18A on one side of the base slide 18 are positively formed with respect to the slide rail 27A as described—regardless of whether they are on the left or the right side of the base slide 18 as viewed in the transfer direction 17'—while the rollers 18B on the other side rest with their circumferential surface, which is convex in cross section, on the running surface of the slide rail 27A, 27B, which is less convex in the longitudinal direction 10, in particular planar, running surface of the slide rail 27B can move in longitudinal direction 10.

In the case of the rollers 18A, the groove could represent a prism and the part of the cross section of the roller 27A facing in the opposite direction could likewise represent a prism.

In the illustrated embodiment, however, the fillet in the roller 18A has, in its outer peripheral region, a peripheral surface 18A1 which is straight in cross section and angled with respect to one another and which corresponds in inclination to a tangent to the circular cross section of the slide rail 27A at that peripheral location of the slide rail against which it thus bears.

The central cross sectional area 18A2 of the fillet has a smaller radius of curvature than the round cross section of the slide rail 27A, and is contiguous with the inner ends of the peripheral surfaces 18A1, and is therefore not in contact with the slide rail 27A.

Axially on both sides away from the fillet, the rollers 18A have an annular cylindrical peripheral surface 18A3 whose diameter corresponds in particular to the largest diameter of the rollers 18B.

FIG. 4 also shows that on the underside of the base slide 18 there is a guide rail 24 running in the transfer direction 17', which runs in the longitudinal pressing direction 10 with very close tolerances in a guide shoe 23 fixed to the base frame 12 of the machine, which also supports the two slide rails 27A and 27B.

FIG. 5*a* shows in the top view of the base slide 18 that the guide shoe 23 with a groove is only present in the last section of the transfer distance from the loading position to the cutting position, i.e., the guide rail 24 present on the base slide 18 only dips into the guide shoe 23 on the last part of this transfer distance, approximately the last 20 cm, before the base slide 18 reaches the cross stop 33, i.e., the cutting position.

The groove of the guide shoe 23 has a lead-in slope at the end from which the guide rail 24 moves in.

Since the guide shoe 23 guides the base slide 18 via the guide rail 24 in the longitudinal pressing direction 10, i.e., in particular relative to the blade plane 3", more precisely than the form fit between the rollers 18A and the slide rail 27A partially moved into it, the immersion of the guide rails 24 in the groove of the guide shoe 23 can lead to a slight misalignment of the base slide 18 in the longitudinal pressing direction 10, i.e., to a one-sided lifting of the rollers 18A from the slide rail 27A.

Figure 5B:
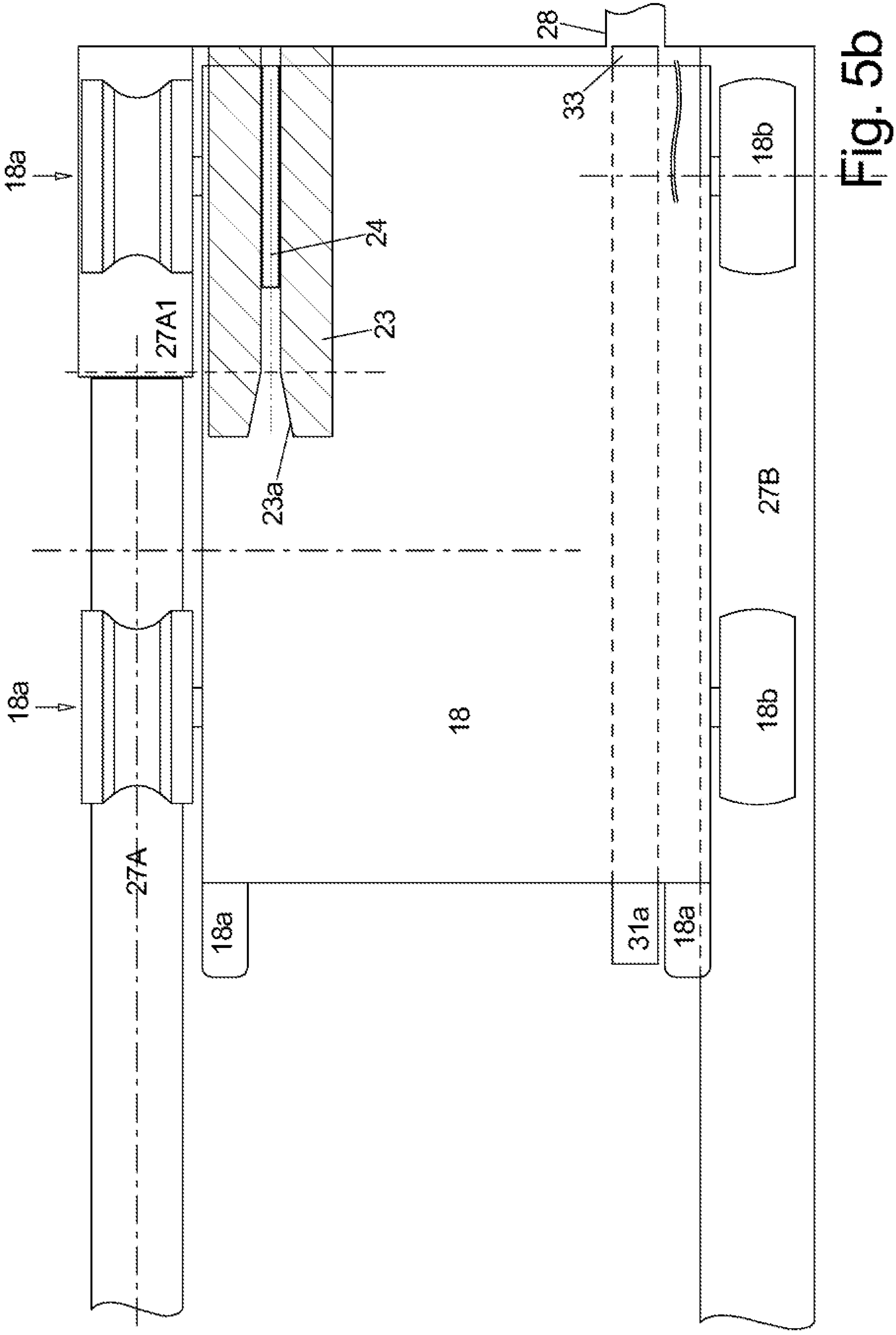

In order to avoid this, the slide rail 27A can end with its convex running surface from the position in transfer direction 17', in which the insertion slope 23*a* changes into a constant groove width of the groove in the guide shoe 23, and a flat running surface of a slide rail 27A1 can follow it at such a height that the at least foremost roller 18A in the direction of the transverse stop 33 can continue to roll on it with its cylindrical circumferential surfaces 18A3 up to the transverse stop 33 without being displaced in transverse direction 11.1, as shown in FIG. 5*b*. The same applies to the counter-roller 18A* and the running surface on the underside of this slide rail 27A1.

Figure 6:
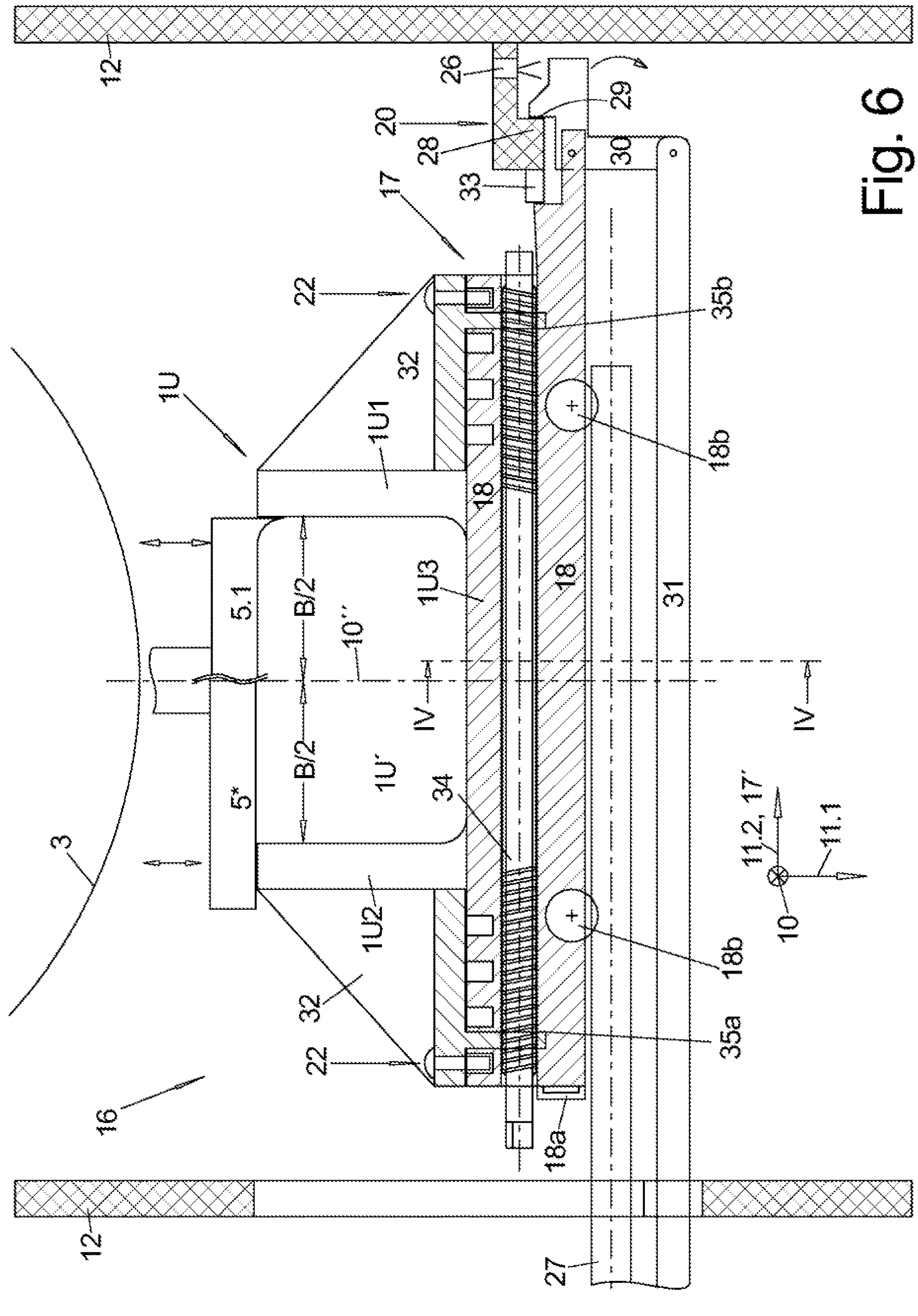
FIG. 6: a second embodiment of a loading device according to the invention, shown analogously to FIG. 3*a*.

FIG. 6 shows a view analogous to FIG. 3*a*, in which, however, the transfer device 17 in a second design is constructed in such a way that the side walls 1U1 and 1U2 can only move in counter-synchronism, i.e., due to the initially equal distance B/2 to the longitudinal center plane 10" due to a corresponding counter-synchronous mechanism, they always assume the same distance to the left and right of the longitudinal center plane 10". This distance can again be set in steps according to the available widths of the various cross press stamps 5.1 to 5.6, but in this way the bottom of the forming tube channel can be fixed to the base slide 18 or be part of this base slide, so that the additional slide can be omitted and only the two side walls with the counter-synchronous mechanism—in this case a threaded spindle with two counter-rotating threaded sections one behind the other and spindle nuts connected axially fixed to the two side walls—which can be moved individually relative to the bottom 1U3 need to be present, as well as on one of the two additional slides the one locking device analogous to the locking device 21 or 22 of FIG. 3*a, b.*

LIST OF REFERENCE NUMERALS

1 forming tube
1' forming tube cavity
1U forming tube channel
1U' channel cavity
1U1,1U2 side wall
1U3 bottom
1*a* cutting end
2 slider
3 blade
3' blade axis
3' blade plane
3*a* blade, cutting edge
4.1-4.5 longitudinal press stamp
5.1-5.6 cross press stamp
6 longitudinal press drive
7 cross press drive
8 discharge conveyor
9 support plate
10 axial direction, longitudinal direction, longitudinal press direction
10" longitudinal center plane
11 transverse direction, radial direction
11.1 1. transverse direction, transverse pressing direction
11.2 2. transverse direction
12 base frame
13 longitudinal stamp turret
13' rotary axis, shift axle
14 stop element, stop plate
14' stop plane
14*a* functional edge
15 cross stamp turret
15 shift axle
16 loading device
18A, B roller, slider roller
18A" longitudinal center plane
18A1 first running surface
18A2 center area
18A3 cylindrical peripheral surface
17 transfer device
18 base slide
18*a* pull handle
19 additional slide
20 latching device
21 latching device
22 latching device
23 guide shoe
24 guide rail
25 axial positioning device
26 End position sensor
27A, B slide rail
28 latching projection
29 latching nose
30 tilting lever
31 drawbar
31*a* handle
32 supplementary slide
33 cross stop
100 product piece
100* caliber
101 slice
A distance
B width forming tube channel

The invention claimed is:

1. A slicing machine for slicing a piece of product from a foodstuff into slices, comprising:

a base frame, a forming tube channel fastened to the base frame and extending in a longitudinal direction, with an open longitudinal side and a channel cavity open at both ends, at least one cross press stamp which can be inserted into the open longitudinal side of the forming tube channel in a first transverse direction to form a circumferentially closed forming tube, at least one longitudinal press stamp which can be inserted into the forming tube from a rear end for advancing as well as longitudinally pressing the product piece located therein in a feeding direction toward a cutting end of the forming-tube tube, a cutting device with a blade which is arranged in front of the cutting end of the forming tube and is displaceable in a transverse direction relative to the forming tube, a loading device for loading the forming tube channel which is open on the longitudinal side, wherein the loading device comprises a transfer device which supports the forming tube channel and which is capable of transferring the forming tube channel from a loading position further away from an upright longitudinal center plane of the at least one cross press-stamp in transfer direction transverse to the feed direction to a slicing position in which the longitudinal center plane runs between side walls of the forming tube channel.

2. The slicing machine according to claim 1, wherein the transfer device comprises a base slide displaceable in the transfer direction, the basic slide carries the forming tube channel, which is displaceable by means of the transfer device between the loading position and a slicing position.

3. The slicing machine according to claim 2, wherein the side walls of the forming tube channel comprise a first side wall and a second side wall that are displaceable relative to each other in a second transverse direction, wherein the first side wall is fixedly fastened to an additional slide, which is arranged on the base slide so as to be displaceable in the transfer direction, and the second side wall is adjustable relative to the additional slide, or the first side wall is fixedly fastened to the base slide and the second side wall is adjustable relative to the base slide, or both side walls are synchronously adjustable towards or away from each other.

4. The slicing machine according to claim 3, wherein position of the additional slide relative to the base slide can be fixed in the transverse direction by means of a first locking device and/or position of a transverse stop relative to the base frame of the machine can be fixed by means of a first locking device in the transverse direction and/or position of the second side wall relative to the additional slide or to the base slide can be fixed in the transverse direction by means of a second detent device.

5. The slicing machine according to claim 1, wherein an axial positioning device is provided, by which the forming tube channel can be positioned axially in the slicing position.

6. The slicing machine according to claim 1, wherein an end position sensor is provided, which detects reaching of the slicing position by the forming tube channel.

7. The slicing machine according to claim 1, wherein a latching device is provided for locking the transfer device in the transfer direction in the slicing position.

8. The slicing machine according to claim 1, wherein a transverse stamp sensor is provided for detecting whether the at least one cross stamp is located outside the forming tube channel.

9. The slicing according to claim 1, wherein a controlled drive is provided for movement and/or adjustment of the transfer device.

10. The slicing machine according to claim 2, wherein the base slide runs on base guides extending in the transfer direction, the base guides are embodied in such a way that the base slide, when in the slicing position, deflects the base guides when the forming tube channel is loaded in the first transverse direction by transverse pressing, a support body is arranged on the base frame under the base slide in the cutting position in such a way that the base slide maintains a distance therefrom in an unloaded state and reaches the support body and is supported by the support body when loaded by the transverse pressing.

11. A method for slicing a product piece with the slicing machine according to claim 1, wherein the product piece in the forming tube channel from the loading position further away from the upright longitudinal center plane of the at least one cross press stamp is transferred in the transfer direction to the slicing position in which the longitudinal center plane extends between side walls of the forming tube channel.

12. The method according to claim 11, wherein the product piece is transferred by loading the forming tube channel in the loading position outside the base frame of the machine with the product piece and transferring the loaded forming tube channel into an interior of the slicing machine to the slicing position of the forming tube channel.

13. The method according to claim 12, wherein the loaded forming tube channel is fixed in the slicing position before start of a cutting operation.

14. The method according to claim 12, wherein the loaded forming tube channel is finely adjusted in the longitudinal direction relative to a blade plane of the blade during a transfer operation and/or the side walls of the forming tube channel are fixed in their distance in transverse direction relative to each other and/or relative to the longitudinal center plane.

15. The method according to claim 12, wherein the loaded forming tube channel, when loaded in the first transverse direction, contacts a support body which is arranged under an underside of the forming tube channel due to material elasticity of the machine and is supported by the support body.

* * * * *